United States Patent
Gubbi Lakshminarasimha et al.

(10) Patent No.: US 12,309,166 B2
(45) Date of Patent: May 20, 2025

(54) METHOD AND SYSTEM FOR SERVICE AUTHENTICATION IN AN AIRPORT MANAGEMENT NETWORK

(71) Applicant: Tata Consultancy Services Limited, Mumbai (IN)

(72) Inventors: Jayavardhana Rama Gubbi Lakshminarasimha, Bangalore (IN); Raj Anil Chaudhari, Bangalore (IN); Meena Singh Dilip Thakur, Bangalore (IN); Balamuralidhar Purushothaman, Bangalore (IN); Rajan Mindigal Alasingara Bhattachar, Bangalore (IN); Sivakumar Kuppusamy Santhanam, Chennai (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 218 days.

(21) Appl. No.: 18/112,649

(22) Filed: Feb. 22, 2023

(65) Prior Publication Data

US 2023/0308454 A1    Sep. 28, 2023

(30) Foreign Application Priority Data

Mar. 1, 2022 (IN) .............................. 202221011001

(51) Int. Cl.
*G06F 21/00* (2013.01)
*H04L 9/40* (2022.01)

(52) U.S. Cl.
CPC .......... *H04L 63/108* (2013.01); *H04L 63/101* (2013.01)

(58) Field of Classification Search
CPC .. H04L 63/108; H04L 63/101; H04L 63/0853
See application file for complete search history.

(56) References Cited

U.S. PATENT DOCUMENTS

| | | | | |
|---|---|---|---|---|
| 6,490,680 B1 * | 12/2002 | Scheidt | ................ | H04L 9/3231 713/176 |
| 7,016,966 B1 * | 3/2006 | Saulpaugh | .............. | H04L 67/10 709/230 |
| 7,398,533 B1 * | 7/2008 | Slaughter | ................ | H04L 67/51 719/328 |
| 8,402,514 B1 * | 3/2013 | Thompson | .............. | H04L 63/08 726/4 |
| 10,097,536 B2 * | 10/2018 | Wu | ..................... | G06F 21/6209 |
| 10,387,673 B2 * | 8/2019 | Surla | ..................... | H04L 9/0662 |
| 11,886,464 B1 * | 1/2024 | Oliner | .................. | G06F 16/282 |

(Continued)

*Primary Examiner* — Kendall Dolly
(74) *Attorney, Agent, or Firm* — FINNEGAN, HENDERSON, FARABOW, GARRETT & DUNNER LLP

(57) ABSTRACT

State of the art systems used for airport automation and data processing may be prone to data security related issues, as unauthorized personal may gain entry to sensitive data. The disclosure herein generally relates to airport management, and, more particularly, to a method and system for service authentication in an airport management network. The system uses a neural network to process a received service request and decides whether the service request is to be allowed or denied, based on a determined validity of the service request, role based access defined for a user requesting the service, a feature map data generated. Accordingly the system allows or denies the service request.

18 Claims, 10 Drawing Sheets

(56) References Cited

U.S. PATENT DOCUMENTS

| | | | |
|---|---|---|---|
| 2004/0122960 A1* | 6/2004 | Hall | H04L 63/20 |
| | | | 709/229 |
| 2008/0011862 A1* | 1/2008 | Silverbrook | G06Q 30/0185 |
| | | | 235/494 |
| 2014/0214915 A1* | 7/2014 | Dragon | H04L 43/0817 |
| | | | 709/201 |
| 2015/0101032 A1* | 4/2015 | Shimakawa | G06F 21/62 |
| | | | 726/8 |
| 2020/0089652 A1* | 3/2020 | Jayaraman | G06N 20/00 |
| 2021/0144517 A1* | 5/2021 | Guim Bernat | H04L 47/781 |
| 2021/0216849 A1* | 7/2021 | Poghosyan | G06N 3/08 |
| 2024/0152919 A1* | 5/2024 | Shetty | G06Q 20/3825 |
| 2024/0291831 A1* | 8/2024 | Tembey | H04L 63/1416 |

\* cited by examiner

METHOD AND SYSTEM FOR SERVICE AUTHENTICATION IN AN AIRPORT MANAGEMENT NETWORK

PRIORITY CLAIM

This U.S. patent application claims priority under 35 U.S.C. § 119 to: India Application No. 202221011001, filed on Mar. 1, 2022. The entire contents of the aforementioned application are incorporated herein by reference.

TECHNICAL FIELD

This disclosure relates generally to airport management, and more particularly to a method and system for service authentication in an airport management network.

BACKGROUND

Airport management involves a variety of processes such as but not limited to passenger verification, baggage verification, baggage management, and so on. During all these processes a lot of information is being handled between different stakeholders, and significant amount of manual intervention is required at many stages of data processing and decision making.

The inventors here have recognized several technical problems with such conventional systems, as explained below. The manual interventions are prone to human errors. With the advancement in technology, some level of automation has been achieved in the airport management domain, with systems deployed to handle data processing associated with one or more of the processes. However, as the data being handled, such as the passenger information, is of sensitive nature, it is important that data security and privacy are ensured while automating the airport management processes. Thus, it is also important to ensure that strict verification processes are in place to provide secured access to data and processes.

SUMMARY

Embodiments of the present disclosure present technological improvements as solutions to one or more of the above-mentioned technical problems recognized by the inventors in conventional systems. For example, in one embodiment, a processor implemented method of service authentication in an airport management network is provided. In this method, initially a service request is obtained at a transmitting node of the airport management network, via one or more hardware processors. Further, expiry of the service request is verified via the one or more hardware processors. Verifying the expiry of the service request involves the following steps. Initially, a time stamp and a date stamp are extracted from the service request. Further, a time vector is generated by processing the time stamp using a generated first data model. Then a date vector is generated by processing the date stamp using a generated second data model. Further, the time vector and the date vector are concatenated to generate a concatenated time-date vector. The concatenated time-date vector is then processed using a first dense layer of a neural network implemented by the one or more hardware processors, wherein the dense layer determines whether the service request is expired or not. If the service request is determined as not expired, then the service request is processed with a Role Based Access Control (RBAC) data and a generated feature map data, via the one or more hardware processors. The RBAC data indicates access permission of a user who raised the service request, and the feature map data confirms that the service request raised at the transmitting node and a service request received at a receiving node of the airport management network are matching. Further, one of a) allowing a requested service, or b) denying the requested service, is performed at the receiving node, via the one or more hardware processors, based on the processing of the service request with the RBAC data and the feature map data.

In another aspect, the first data model is generated by processing the time stamp using a first branch of the neural network. Processing of the time stamp using the first branch includes the following steps. Initially, the service request and a time expiration data are concatenated to form a first concatenation vector. Further, the first concatenation vector is converted from a default secure information format to an embedding format using a Long Short Term Memory (LSTM) encoder of the first branch. Further, one or more variations are selected from among a plurality of variations identified in the first concatenation vector in the embedding format, as focused variations, using an attention layer of the first branch. The one or more focused variations are then decoded using a LSTM decoder of the first branch. Further, output of the LSTM decoder is processed using a time-distributed dense layer of the first branch to reduce number of trainable parameters at a defined minimum level. The trainable parameters are then used to generate the first data model.

In yet another aspect, the second data model is generated by processing the date stamp using a second branch of the neural network. Processing the date stamp using a second branch includes the following steps. Initially, the service request and a date expiration data are concatenated to form a second concatenation vector. The second concatenation vector is then converted from a default secure information format to an embedding format using a Long Short Term Memory (LSTM) encoder of the second branch. Further, one or more variations are selected from among a plurality of variations identified in the second concatenation vector in the embedding format, as focused variations, using an attention layer of the second branch. The one or more focused variations are then decoded using a LSTM decoder of the second branch. Further, output of the LSTM decoder is processed using a time-distributed dense layer of the second branch to reduce number of trainable parameters at a defined minimum level.

In yet another aspect, a system for service authentication in an airport management network is provided. The system includes one or more hardware processors, a communication interface, and a memory storing a plurality of instructions. The plurality of instructions when executed, cause the one or more hardware processors to initially obtain a service request at a transmitting node of the airport management network. Further, expiry of the service request is verified via the one or more hardware processors. Verifying the expiry of the service request involves the following steps. Initially, a time stamp and a date stamp are extracted from the service request. Further, a time vector is generated by processing the time stamp using a generated first data model. Then a date vector is generated by processing the date stamp using a generated second data model. Further, the time vector and the date vector are concatenated to generate a concatenated time-date vector. The concatenated time-date vector is then processed using a first dense layer of a neural network implemented by the one or more hardware processors, wherein the dense layer determines whether the service request is expired or not. If the service request is determined as not expired, then the service request is processed with a Role Based Access Control (RBAC) data and a generated feature map data, via the one or more hardware processors. The RBAC data indicates access permission of a user who raised the service request, and the feature map data confirms that the service request raised at the transmitting node and a service request received at a receiving node of the airport management network are matching. Further, one of a) allowing a requested service, or b) denying the requested service, is performed at the receiving node, via the one or more hardware processors, based on the processing of the service request with the RBAC data and the feature map data.

In yet another aspect, the one or more hardware processors of the system are configured to generate the first data model by processing the time stamp using a first branch of the neural network. Processing of the time stamp using the first branch includes the following steps. Initially, the service request and a time expiration data are concatenated to form a first concatenation vector. Further, the first concatenation vector is converted from a default secure information format to an embedding format using a Long Short Term Memory (LSTM) encoder of the first branch. Further, one or more variations are selected from among a plurality of variations identified in the first concatenation vector in the embedding format, as focused variations, using an attention layer of the first branch. The one or more focused variations are then decoded using a LSTM decoder of the first branch. Further, output of the LSTM decoder is processed using a time-distributed dense layer of the first branch to reduce number of trainable parameters at a defined minimum level. The trainable parameters are then used to generate the first data model.

In yet another aspect, the one or more hardware processors of the system are configured to generate the second data model by processing the date stamp using a second branch of the neural network. Processing the date stamp using a second branch includes the following steps. Initially, the service request and a date expiration data are concatenated to form a second concatenation vector. The second concatenation vector is then converted from a default secure information format to an embedding format using a Long Short Term Memory (LSTM) encoder of the second branch. Further, one or more variations are selected from among a plurality of variations identified in the second concatenation vector in the embedding format, as focused variations, using an attention layer of the second branch. The one or more focused variations are then decoded using a LSTM decoder of the second branch. Further, output of the LSTM decoder is processed using a time-distributed dense layer of the second branch to reduce number of trainable parameters at a defined minimum level.

In yet another aspect, a non-transitory computer readable medium for service authentication in an airport management network is provided. The non-transitory computer readable medium includes a plurality of instructions, which when executed, cause one or more hardware processors to perform the following steps for the service authentication request. Initially a service request is obtained at a transmitting node of the airport management network. Further, expiry of the service request is verified. Verifying the expiry of the service request involves the following steps. Initially, a time stamp and a date stamp are extracted from the service request. Further, a time vector is generated by processing the time stamp using a generated first data model. Then a date vector is generated by processing the date stamp using a generated second data model. Further, the time vector and the date vector are concatenated to generate a concatenated time-date vector. The concatenated time-date vector is then processed using a first dense layer of a neural network implemented by the one or more hardware processors, wherein the dense layer determines whether the service request is expired or not. If the service request is determined as not expired, then the service request is processed with a Role Based Access Control (RBAC) data and a generated feature map data, via the one or more hardware processors. The RBAC data indicates access permission of a user who raised the service request, and the feature map data confirms that the service request raised at the transmitting node and a service request received at a receiving node of the airport management network are matching. Further, one of a) allowing a requested service, or b) denying the requested service, is performed at the receiving node, based on the processing of the service request with the RBAC data and the feature map data.

In yet another aspect, the non-transitory computer readable medium is configured to generate the first data model by processing the time stamp using a first branch of the neural network. Processing of the time stamp using the first branch includes the following steps. Initially, the service request and a time expiration data are concatenated to form a first concatenation vector. Further, the first concatenation vector is converted from a default secure information format to an embedding format using a Long Short Term Memory (LSTM) encoder of the first branch. Further, one or more variations are selected from among a plurality of variations identified in the first concatenation vector in the embedding format, as focused variations, using an attention layer of the first branch. The one or more focused variations are then decoded using a LSTM decoder of the first branch. Further, output of the LSTM decoder is processed using a time-distributed dense layer of the first branch to reduce number of trainable parameters at a defined minimum level. The trainable parameters are then used to generate the first data model.

In yet another aspect, the non-transitory computer readable medium is configured to generate the second data model by processing the date stamp using a second branch of the neural network. Processing the date stamp using a second branch includes the following steps. Initially, the service request and a date expiration data are concatenated to form a second concatenation vector. The second concatenation vector is then converted from a default secure information format to an embedding format using a Long Short Term Memory (LSTM) encoder of the second branch. Further, one or more variations are selected from among a plurality of variations identified in the second concatenation vector in the embedding format, as focused variations, using an attention layer of the second branch. The one or more focused variations are then decoded using a LSTM decoder of the second branch. Further, output of the LSTM decoder is processed using a time-distributed dense layer of the second branch to reduce number of trainable parameters at a defined minimum level.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Figure 1:
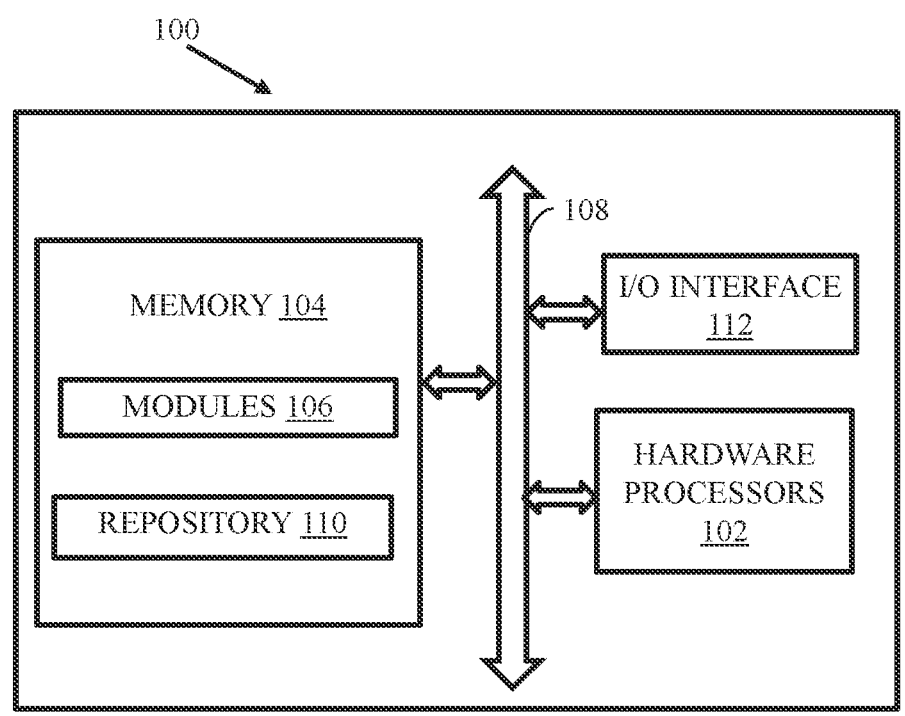
FIG. 1 is an exemplary system for service authentication, according to some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

Airport management involves handling sensitive customer and airline information, expensive and confidential luggage and so on. So it is important that appropriate security measures are in place to ensure data security and privacy. Embodiments herein provide a method and system for service authentication in an airport management network. The system fetches/receives service requests related to various services being handled at the airport, such as but not limited to passenger verification, and luggage verification. The system then processes the received service request to perform authentication check based on a combination of a) expiry of the service request, b) access permissions defined in terms of Role Based Access Control (RBAC), and c) a feature map generated to ensure that the service request raised at a transmitting node matches the service request received at a receiving node in an airport management network.

Referring now to the drawings, and more particularly to FIG. 1 through FIG. 9, where similar reference characters denote corresponding features consistently throughout the figures, there are shown preferred embodiments and these embodiments are described in the context of the following exemplary system and/or method.

FIG. 1 is an exemplary system for service authentication, according to some embodiments of the present disclosure. The system 100 includes or is otherwise in communication with hardware processors 102, at least one memory such as a memory 104, an I/O interface 112. The hardware processors 102, memory 104, and the Input/Output (I/O) interface 112 may be coupled by a system bus such as a system bus 108 or a similar mechanism. In an embodiment, the hardware processors 102 can be one or more hardware processors.

The I/O interface 112 may include a variety of software and hardware interfaces, for example, a web interface, a graphical user interface, and the like. The I/O interface 112 may include a variety of software and hardware interfaces, for example, interfaces for peripheral device(s), such as a keyboard, a mouse, an external memory, a printer and the like. Further, the I/O interface 112 may enable the system 100 to communicate with other devices, such as web servers, and external databases.

The I/O interface 112 can facilitate multiple communications within a wide variety of networks and protocol types, including wired networks, for example, local area network (LAN), cable, etc., and wireless networks, such as Wireless LAN (WLAN), cellular, or satellite. For the purpose, the I/O interface 112 may include one or more ports for connecting several computing systems with one another or to another server computer. The I/O interface 112 may include one or more ports for connecting several devices to one another or to another server.

The one or more hardware processors 102 may be implemented as one or more microprocessors, microcomputers, microcontrollers, digital signal processors, central processing units, node machines, logic circuitries, and/or any devices that manipulate signals based on operational instructions. Among other capabilities, the one or more hardware processors 102 is configured to fetch and execute computer-readable instructions stored in the memory 104.

The memory 104 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, the memory 104 includes a plurality of modules 106.

The plurality of modules 106 include programs or coded instructions that supplement applications or functions performed by the system 100 for executing different steps involved in the service authentication being handled by the system 100. The plurality of modules 106, amongst other things, can include routines, programs, objects, components, and data structures, which performs particular tasks or implement particular abstract data types. The plurality of modules 106 may also be used as, signal processor(s), node machine(s), logic circuitries, and/or any other device or component that manipulates signals based on operational instructions. Further, the plurality of modules 106 can be used by hardware, by computer-readable instructions executed by the one or more hardware processors 102, or by a combination thereof. The plurality of modules 106 can include various sub-modules (not shown). The plurality of modules 106 may include computer-readable instructions that supplement applications or functions performed by the system 100 for executing the different steps involved in the service authentication process.

The data repository (or repository) 110 may include a plurality of abstracted piece of code for refinement and data that is processed, received, or generated as a result of the execution of the plurality of modules in the module(s) 106.

Although the data repository 110 is shown internal to the system 100, it will be noted that, in alternate embodiments, the data repository 110 can also be implemented external to the system 100, where the data repository 110 may be stored within a database (repository 110) communicatively coupled to the system 100. The data contained within such external database may be periodically updated. For example, new data may be added into the database (not shown in FIG. 1) and/or existing data may be modified and/or non-useful data may be deleted from the database. In one example, the data may be stored in an external system, such as a Lightweight Directory Access Protocol (LDAP) directory and a Relational Database Management System (RDBMS). Functions of the components of the system 100 are now explained with reference to steps in flow diagrams in FIG. 2 through FIG. 6, the example diagrams in FIGS. 7A and 7B, and the neural network architectures in FIG. 8 and FIG. 9.

Figure 2:
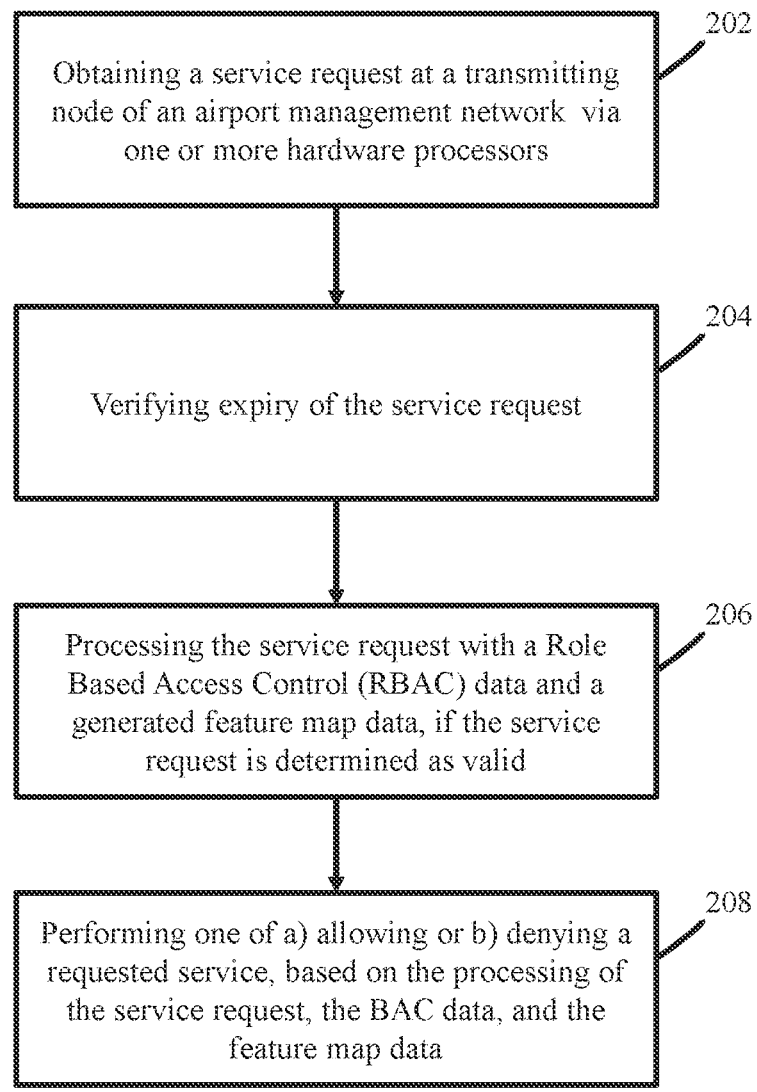
FIG. 2 is a flow diagram depicting steps involved in the process of service authentication by the system of FIG. 1, according to some embodiments of the present disclosure.
Figure 3:
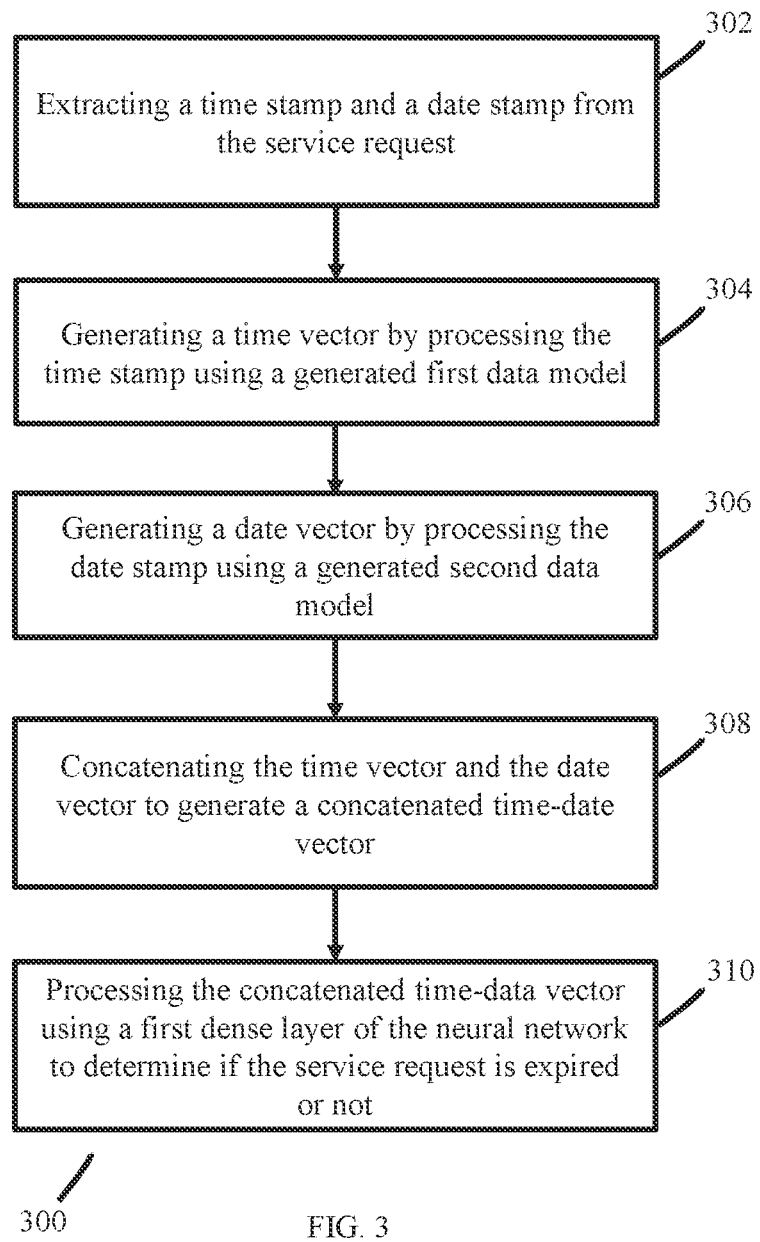
FIG. 3 is a flow diagram depicting steps involved in the process of verifying if a service request has been expired or not, by the system of FIG. 1, according to some embodiments of the present disclosure.

FIG. 2 is a flow diagram depicting steps of a method 200 involved in the process of service authentication by the system of FIG. 1, according to some embodiments of the present disclosure.

In an embodiment, the system 100 comprises one or more data storage devices or the memory 104 operatively coupled to the processor(s) 102 and is configured to store instructions for execution of steps of the method 200 by the processor(s) or one or more hardware processors 102. The steps of the method 200 of the present disclosure will now be explained with reference to the components or blocks of the system 100 as depicted in FIG. 1 and the steps of flow diagram as depicted in FIG. 2. Although process steps, method steps, techniques or the like may be described in a sequential order, such processes, methods, and techniques may be configured to work in alternate orders. In other words, any sequence or order of steps that may be described does not necessarily indicate a requirement that the steps to be performed in that order. The steps of processes described herein may be performed in any order practical. Further, some steps may be performed simultaneously.

At step 202, the system 100 receives a service request at a transmitting node of the of an airport management network, via one or more hardware processors. In an example scenario, consider that the service request is with respect to a user/passenger authentication, as in the example given in FIG. 7A. In this example, consider that passenger credentials (facial feature for verification in this example) have been collected at a check-in kiosk at the airport, and the service request is passenger verification request from a receiver gate (which acts as a transmitting node) to the check-in kiosk (which acts as a receiving node). The service request may include information such as but not limited to facial features captured at the receiver gate. The passenger verification in this context is done by ensuring that the facial features collected at the receiver gate and at the check-in kiosk are matching. In the baggage verification example given in FIG. 7B, the service request is a request from tarmac to the check-in kiosk to verify a baggage, and this request may comprise information on credentials of user requesting the service and characteristics such as but not limited to colour, make, dimensions and so on.

Once the service request is collected by the system 100, at step 204 the system 100 verifies expiry of the service request. The system 100 is configured to consider the service request as valid, based on a determined validity of the service request, wherein the validity of the service request is determined based on time expired since the service request is raised/generated from the transmitting node. Steps involved in the process of verifying expiry of the service request are depicted in a method 300 in FIG. 3 and are explain hereafter.

At step 302 of the method 300, the system 100 extracts a time stamp and a date stamp from the service request. The time stamp and the date stamp are associated with the service request, at the instance the service request is raised. At step 304, the system 100 generates a time vector by processing the time stamp using a generated first data model. Various steps involved in the process of generating the first data model are depicted in a method 400 in FIG. 4, and are explained hereafter.

Figure 4:
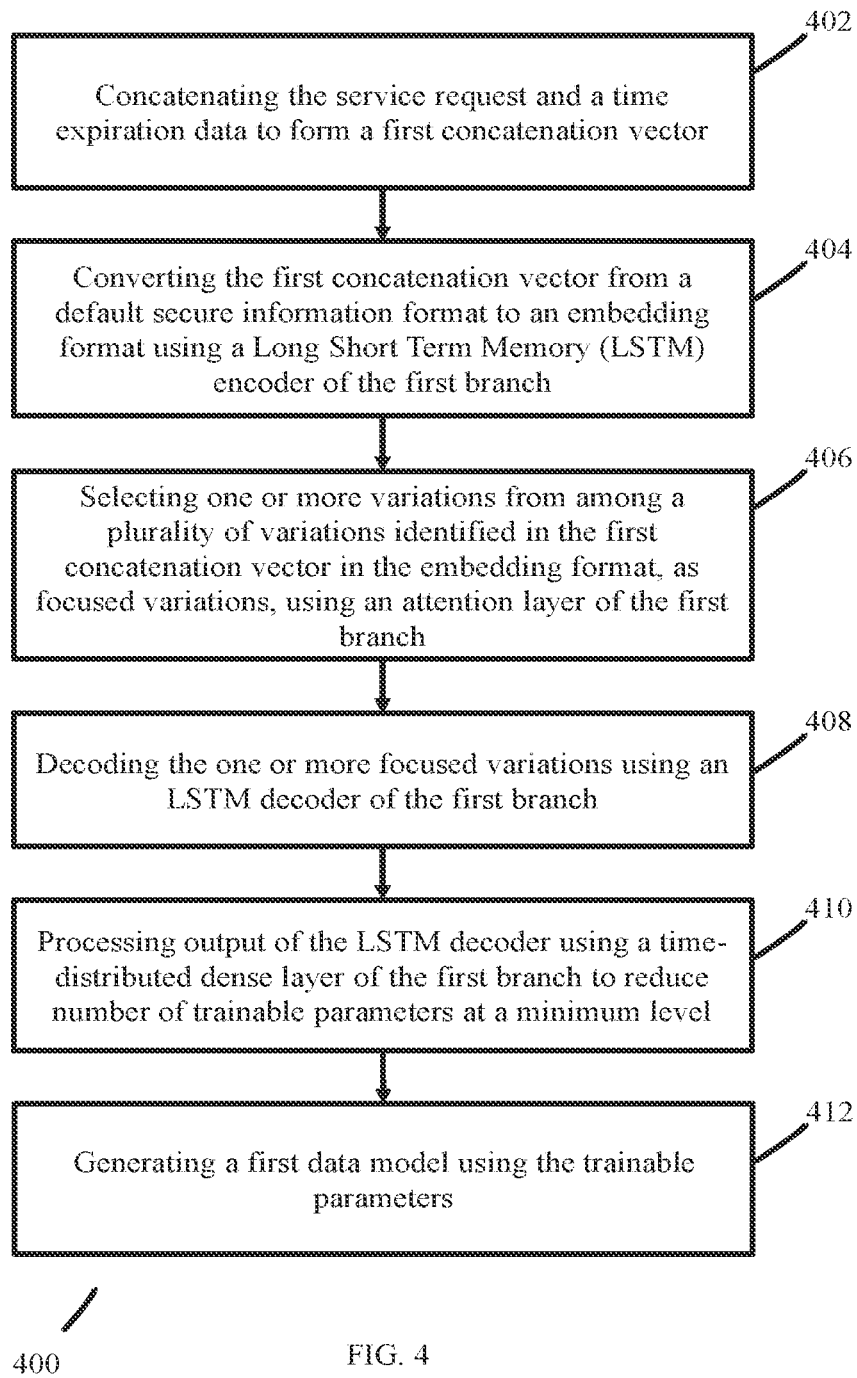
FIG. 4 is a flow diagram depicting steps involved in the process of processing a time vector using a first branch of a neural network, by the system of FIG. 1, according to some embodiments of the present disclosure.
Figure 5:
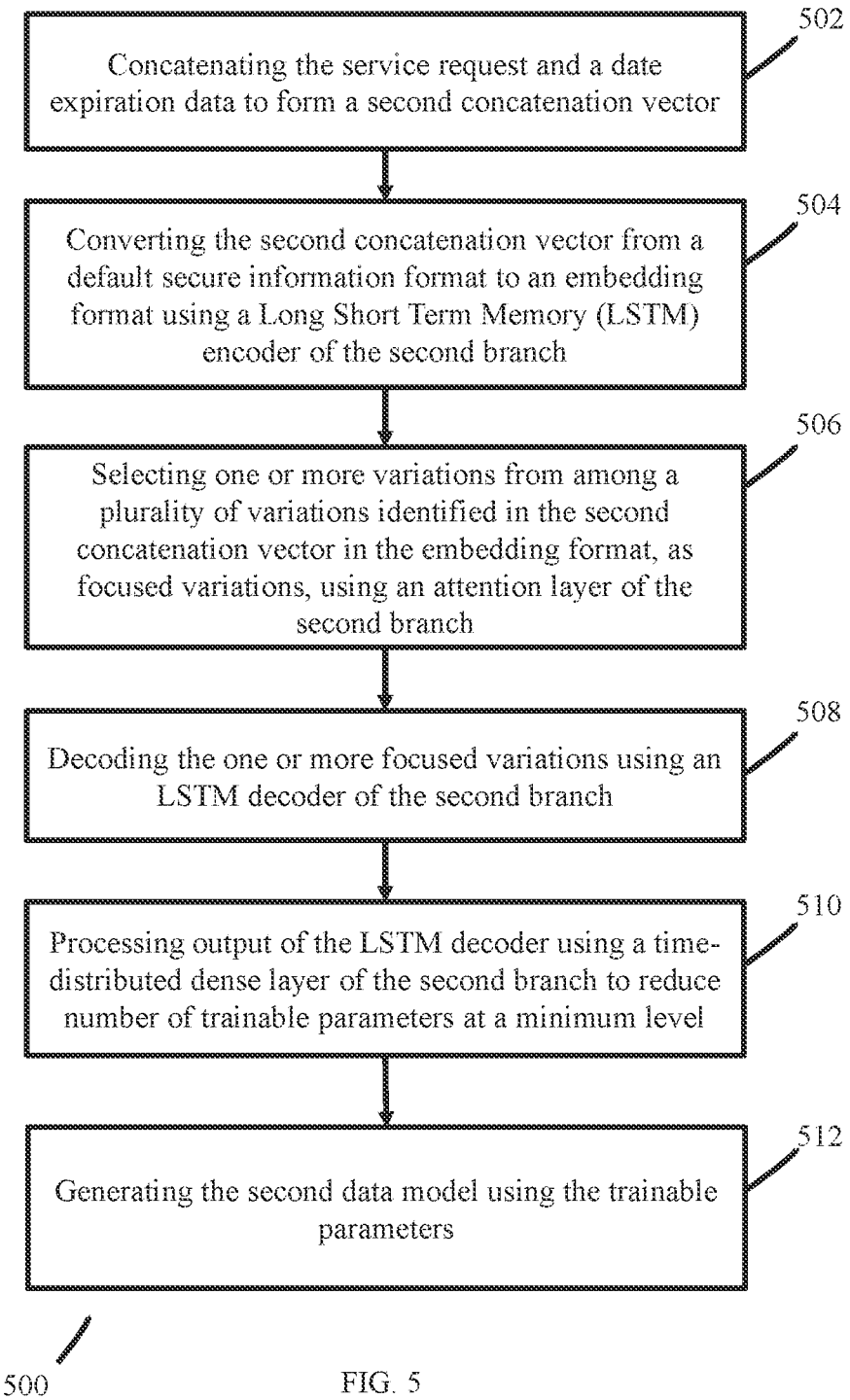
FIG. 5 is a flow diagram depicting steps involved in the process of processing a date vector using a second branch of the neural network, by the system of FIG. 1, according to some embodiments of the present disclosure.
Figure 6:
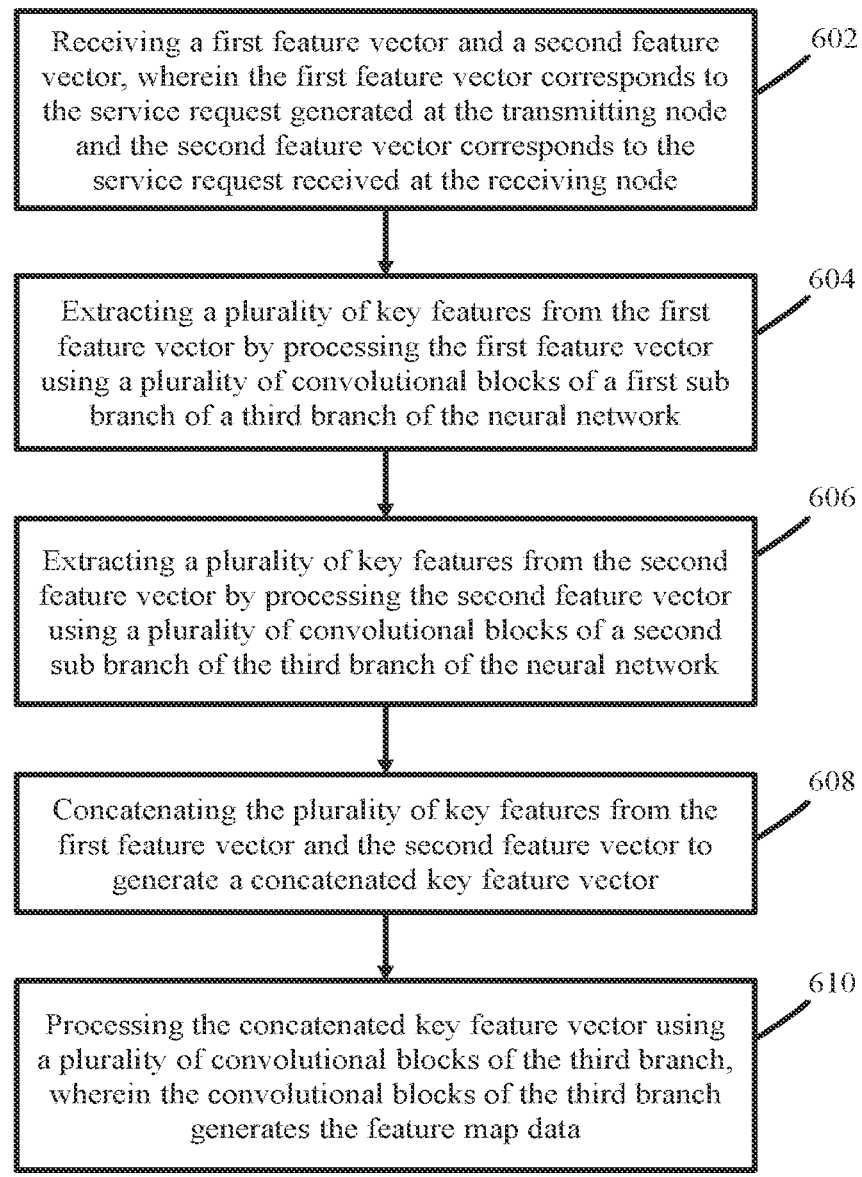
FIG. 6 is a flow diagram depicting steps involved in the process of generating a feature map, by the system of FIG. 1, according to some embodiments of the present disclosure.
Figure 7A:
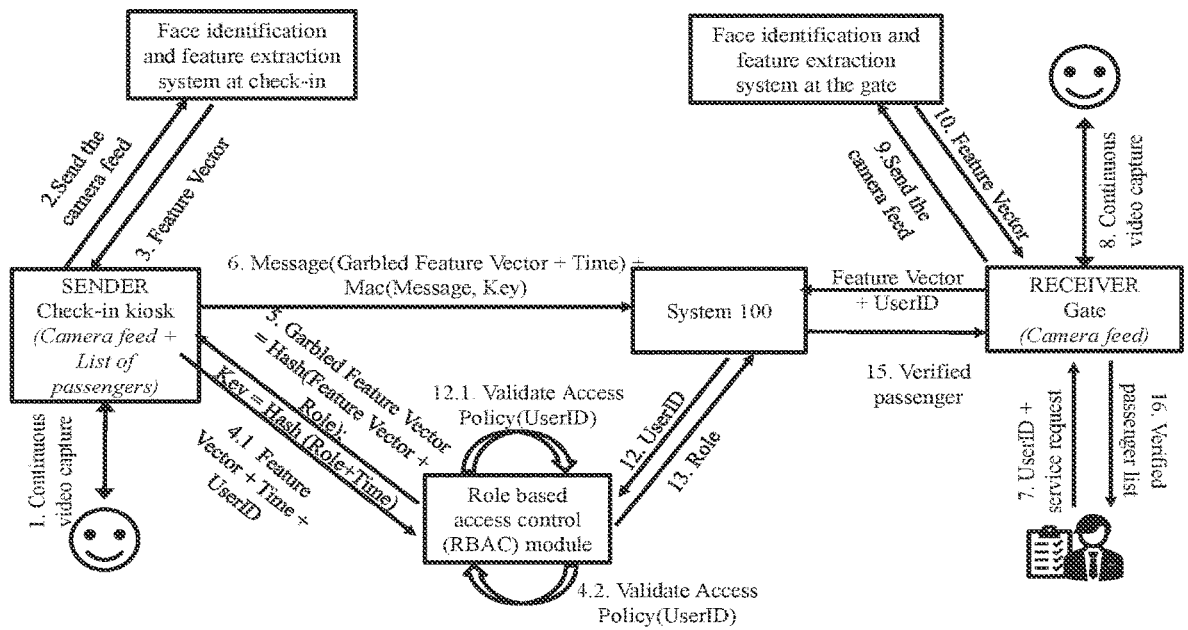
FIGS. 7A and 7B depict working of the system of FIG. 1 in example scenarios related to the airport management, according to some embodiments of the present disclosure.
Figure 7B:
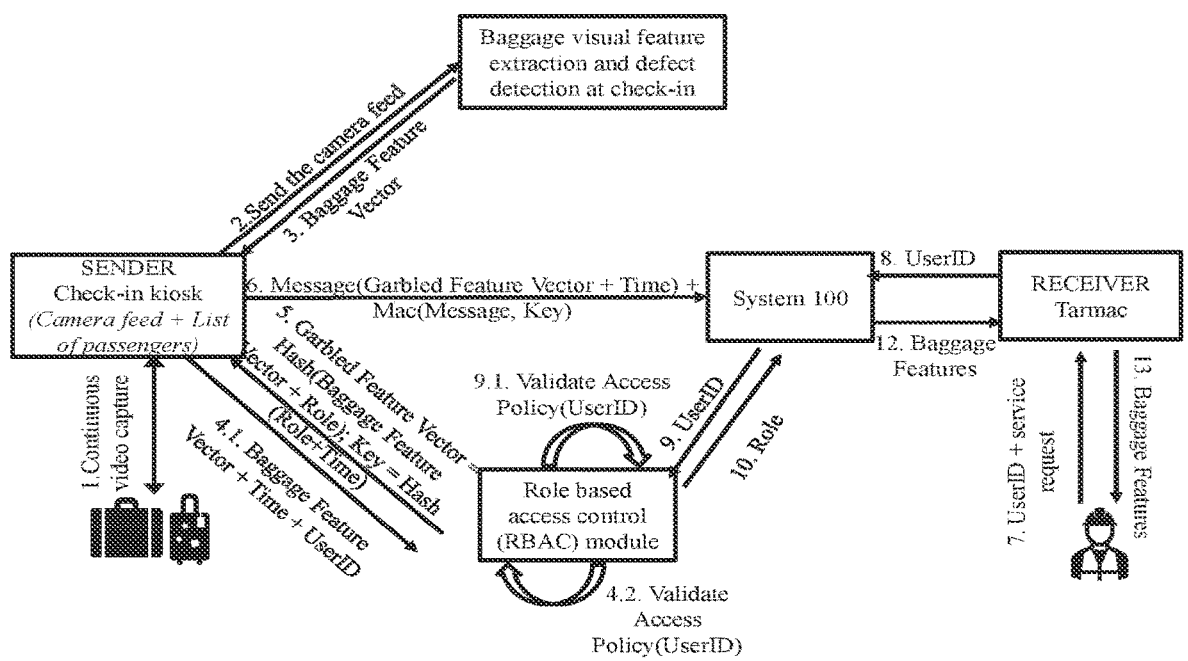
Figure 8:
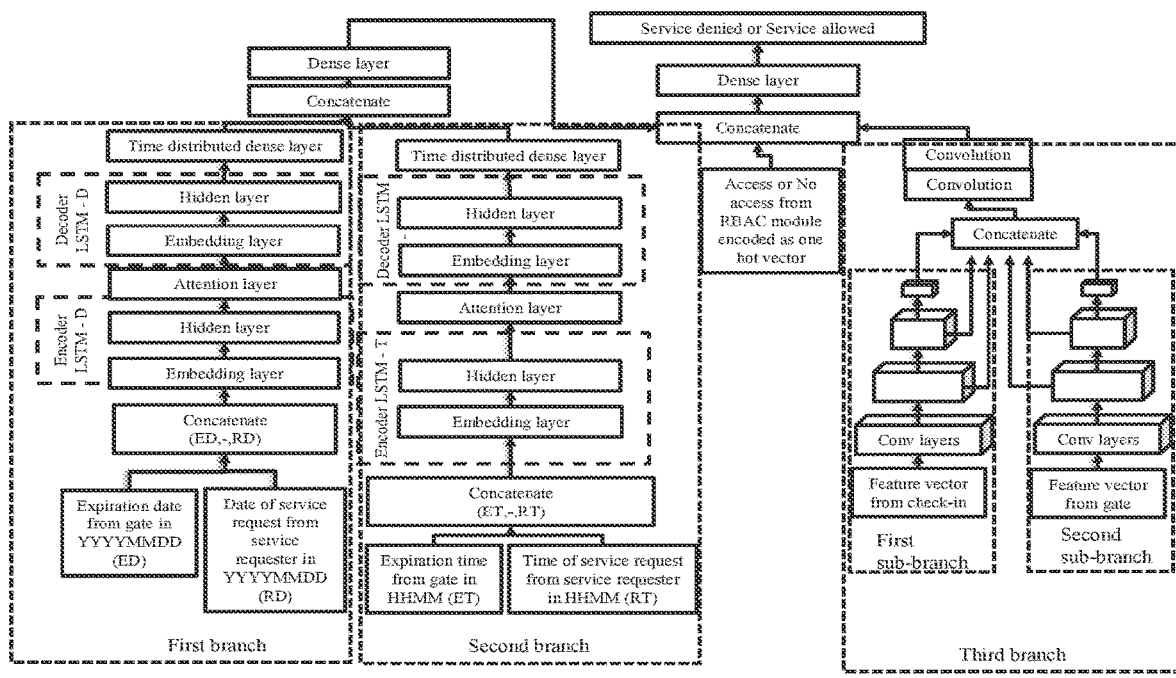
FIG. 8 depicts architecture of a neural network used by the system of FIG. 1, for the service authentication, according to some embodiments of the present disclosure.
Figure 9:
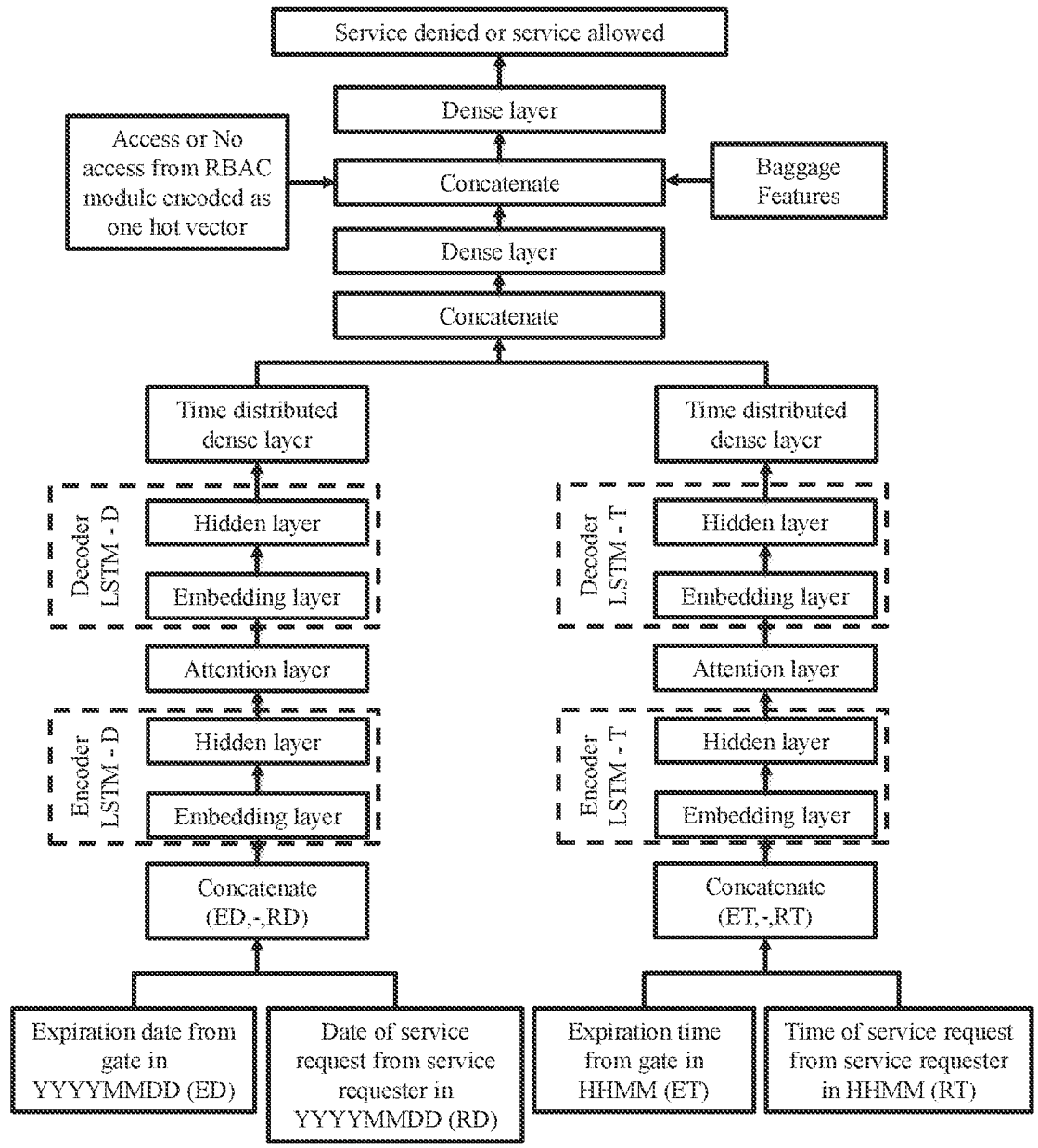
FIG. 9 depicts a variation of the neural network in FIG. 8, for an application specific requirement during the service authentication, according to some embodiments of the present disclosure.

At step 402 of the method 400 in FIG. 4, the system 100 concatenates the service request and a time expiration data to form a first concatenation vector. In an embodiment, the time expiration data is embedded in the service request, which indicates a time period within which the service request is set to expire (for example, 60 seconds, 120 seconds and so on, which may be pre-configured or dynamically configured value), starting from time of departure of an aircraft with which the service request is associated with. For example, if the service request is a passenger verification request, the same is not to be authorized if the specified time has passed from time of departure of the aircraft in which the passenger was supposed to board, wherein the information on the aircraft in which the passenger and/or luggage was to board is captured in the service request, which the system 100 extracts. Further, at step 404, the system 100 converts the first concatenation vector from a default secure information format to an embedding format using a Long Short Term Memory (LSTM) encoder of the first branch. The LSTM has multiple features including, but not limited to, 1) being able to remember information for any amount of time, 2) robust to noise, and 3) the parameters within the LSTM node are trainable. These characteristics aid the LSTM with the conversion of the first concatenation vector from the default secure information format to the embedding format. As in FIG. 8, the LSTM Decoder is comprised of a hidden layer and an embedding layer in the neural network. Further, at step 406, the system 100 selects one or more variations from among a plurality of variations identified in the first concatenation vector in the embedding format, as focused variations, using an attention layer of the first branch. In this context, the term "variations" indicate/represent variation in date and time. For example, as mentioned at step 302, the service request is set to expire within a specified time period. Difference between the instance at which the service request was received and the reference time (i.e. the time of departure of the aircraft) which leads to the service request being expired may be considered as a variation. Between such variations, extent of difference between the between the instance at which the service request was received and the reference time may vary from a few seconds to minutes to hours to days. Such information when used as training data, helps the system 100 to understand which part(s) of the time vector are critical (for example, only the time, and not the month and year) for identifying the variations, and this in turn are referred to as the focused variations. Further, at step 408, the system 100 decodes the one or more focused variations using a LSTM decoder of the first branch (As in FIG. 8, the LSTM Decoder is comprised of a hidden layer and an embedding layer in the neural network), and then at step 410, the system 100 processes output of the LSTM decoder using a time-distributed dense layer of the first branch to reduce number of trainable parameters at a defined minimum level. Further, at step 412, the system 100 uses the trainable parameters as training data to generate the first data model.

Referring to method 300, further, at step 306, the system 100 generates a date vector by processing the date stamp with a second data model. Steps involved in the process of generating the date vector are depicted in a method 500 of FIG. 5 and are explained hereafter. At step 502, the system 100 concatenates the service request and a date expiration data to form a second concatenation vector. Similarly, the date information may be a date expiration data which indicates a time period in terms of date within which the service request is set to expire (for example, within 1 day, 2 days and so on, which may be pre-configured or dynamically configured value), starting from date of departure of an aircraft with which the service request is associated with. For example, if the service request is a passenger verification request, the same is not to be authorized if the specified date has passed from date of departure of the aircraft in which the passenger was supposed to board, wherein the information on the aircraft in which the passenger and/or luggage was to board is captured in the service request, which the system 100 extracts.

Further, at step 504, the system 100 converts the second concatenation vector from a default secure information format to an embedding format using a Long Short Term Memory (LSTM) encoder of the second branch. At this step, characteristics of the LSTM, such as but not limited to 1) being able to remember information for any amount of time, 2) robust to noise, and 3) the parameters within the LSTM node are trainable, aid the LSTM with the conversion of the second concatenation vector from the default secure information format to the embedding format. As in FIG. 8, the LSTM Encoder is comprised of a hidden layer and an embedding layer in the neural network. Further, at step 506, the system 100 selects one or more variations from among a plurality of variations identified in the second concatenation vector in the embedding format, as focused variations, using an attention layer of the second branch. In this context, the term "variations" indicate/represent variation in date and time. For example, as mentioned at step 302, the service request is set to expire within a specified time period in terms of date of request and date of departure of the aircraft. Difference between the date on which the service request was received and the reference date (i.e. the date of departure of the aircraft) which leads to the service request being expired may be considered as a variation. Between such variations, extent of difference between the between the instance at which the service request was received and the reference time may vary from one day to a few days. Such information when used as training data, helps the system 100 to understand which part(s) of the date vector are critical (for example, only the date, and not the month and year) for identifying the variations, and this in turn are referred to as the focused variations. Further, at step 508, the system 100 decodes the one or more focused variations using a LSTM decoder of the second branch (As in FIG. 8, the LSTM Decoder is comprised of a hidden layer and an embedding layer in the neural network), and then at step 510, the system 100 processes output of the LSTM decoder using a time-distributed dense layer of the second branch to reduce number of trainable parameters at a defined minimum level. Further, at step 512, the system 100 uses the trainable parameters as training data to generate the second data model.

Referring back to method 300, further, at step 308, the system 100 concatenates the time vector obtained at output of the first branch and the date vector obtained at output of the second branch to generate a concatenated time-date vector. The system 100 then processes the concatenated time-date vector using a first dense layer of the neural network, wherein the dense layer determines whether the service request is expired or not. The system 100 determines the service request as valid, if the service request is identified as received before the expiration time and/or the expiration date specified. The system 100 determines the service request as invalid, if the service request is identified as received after the expiration time and/or the expiration date specified. If it is determined at step 310, based on the expiry of the date and time, that the service request is invalid, then the system 100 discards the service request and denies the requested service at step 210.

If it is determined at step 310, based on the expiry of the date and time, that the service request is valid, then at step 206, the system 100 processes the service request with a Role Based Access Control (RBAC) data and a generated feature map data. The RBAC data indicates access permission granted to each of a plurality of users. The access request may comprise information on identity of the user who raised/generated the service request. The information on the identity of the user may be a unique ID assigned to the user. The feature map represents similarity between the service request raised/generated at the transmitting node and the service request received at the receiving node. Various steps involved in the process of generating the feature map are depicted in a method 600 given in FIG. 6 and are explained hereafter.

At step 602, the system 100 receives a first feature vector and a second feature vector, wherein the first feature vector corresponds to the service request received at the transmitting node (i.e. from check-in) and the second feature vector corresponds to the service request received at the receiving node (i.e. from the gate). Further, at step 604, the system 100 extracts a plurality of key features from the first feature vector by processing the first feature vector using a plurality of convolutional blocks (also represented as Conv layers) of a first sub-branch of a third branch of the neural network. In an embodiment, the system 100 may use a pre-trained deep neural network (not shown) to extract the features. When used, the pre-trained deep neural network generates unique representation based on either a face captured (in passenger verification application) or a luggage image (in baggage verification application) that is captured. This encoded information is referred to as plurality of features. Further, at step 606, the system 100 extracts a plurality of key features from the second feature vector by processing the second feature vector using a plurality of convolutional blocks of a second sub-branch of the third branch of the neural network. In an embodiment, extraction of the key features from the second feature vector may be similar to how the feature vectors from the first feature vector are extracted i.e. the system 100 may use a pre-trained deep neural network (not shown) to extract the features. When used, the pre-trained deep neural network generates unique representation based on either the face captured (in passenger verification application) or the luggage image (in baggage verification application) that is captured. This encoded information is referred to as plurality of features. Further, at step 608, the system 100 concatenates the plurality of key features from the first feature vector and the plurality of key features from the second feature vector to generate a concatenated key feature vector. Further, at step 610, the system 100 processes the concatenated key feature vector using a plurality of convolution blocks of the third branch, wherein the plurality of convolution blocks of the third branch extracts features that are similar for the first feature vector and the second feature vector, and in turn generates the feature map data, which in turn indicates extent of similarity between the first feature vector and the second feature vector. This in turn helps in verifying authenticity of the service request. For example, between the transmitting node and the receiving node, the service request may get tampered, and this may cause data security issues. By ensuring that the first feature vector and the second feature vector are matching one another, it can be ensured that the service request is not contaminated/tampered.

Referring back to method 200, at step 206, the system 100 verifies the following:
  a. that the user who generated the service request has required permission (based on the RBAC data), and
  b. that the first feature vector and the second feature vector are matching (based on the feature map)

Based on check of these two conditions, then at step 208, the system 100 performs one of the following actions:
  c. if both the conditions are satisfied, the system 100 allows the requested service,
  d. else if at least one of the conditions is not satisfied, the system 100 denies the requested service.

In an embodiment, the neural network may have different variations depending on applications. For example, as in FIG. 9, the RBAC data may be encoded as a one hot vector instead of separately processing it. As a result, only two sub-branches may be required in the neural network.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method of service authentication in an airport management network, comprising:
   obtaining a service request at a transmitting node of the airport management network, via one or more hardware processors;
   verifying expiry of the service request, via the one or more hardware processors, comprising:
      extracting a time stamp and a date stamp from the service request;
      generating a time vector by processing the time stamp using a generated first data model;
      generating a date vector by processing the date stamp using a generated second data model;
      concatenating the time vector and the date vector to generate a concatenated time-date vector;
      processing the concatenated time-date vector using a first dense layer of a neural network implemented by the one or more hardware processors, wherein the dense layer determines whether the service request is expired or not;
   processing the service request with a Role Based Access Control (RBAC) data and a generated feature map data, via the one or more hardware processors, if the service request is determined as not expired, wherein the RBAC data indicates access permission of a user who raised the service request, and the feature map data confirms that the service request received at the transmitting node and a service request received at a receiving node of the airport management network are matching; and
   performing, via the one or more hardware processors, one of a) allowing a requested service, and b) denying the requested service, at the receiving node, based on the processing of the service request with the RBAC data and the feature map data.

2. The method as of claim 1, wherein generating the first data model comprises:
   concatenating the service request and a time expiration data to form a first concatenation vector;
   converting the first concatenation vector from a default secure information format to an embedding format using a Long Short Term Memory (LSTM) encoder of the first branch;
   selecting one or more variations from among a plurality of variations identified in the first concatenation vector in the embedding format, as focused variations, using an attention layer of the first branch;
   decoding the one or more focused variations using a LSTM decoder of the first branch;
   processing output of the LSTM decoder using a time-distributed dense layer of the first branch to reduce number of trainable parameters at a defined minimum level; and
   generating the first data model using the trainable parameters.

3. The method of claim 1, wherein generating the second data model comprises:
   concatenating the service request and a date expiration data to form a second concatenation vector;

converting the second concatenation vector from a default secure information format to an embedding format using a Long Short Term Memory (LSTM) encoder of the second branch;

selecting one or more variations from among a plurality of variations identified in the second concatenation vector in the embedding format, as focused variations, using an attention layer of the second branch;

decoding the one or more focused variations using a LSTM decoder of the second branch;

processing output of the LSTM decoder using a time-distributed dense layer of the second branch to reduce number of trainable parameters at a defined minimum level; and generating the second data model using the trainable parameters.

4. The method of claim 1, wherein generating the feature map data comprises:

receiving a first feature vector and a second feature vector, wherein the first feature vector corresponds to the service request received at the transmitting node and the second feature vector corresponds to the service request received at the receiving node;

extracting a plurality of key features from the first feature vector by processing the first feature vector using a plurality of convolutional blocks of a first sub-branch of a third branch of the neural network;

extracting a plurality of key features from the second feature vector by processing the second feature vector using a plurality of convolutional blocks of a second sub-branch of the third branch of the neural network;

concatenating the plurality of key features from the first feature vector and the plurality of key features from the second feature vector to generate a concatenated key feature vector; and processing the concatenated key feature vector using a plurality of convolution blocks of the third branch, wherein the plurality of convolution blocks of the third branch generates the feature map data.

5. The method of claim 1, wherein the service request is one of a passenger verification request and a baggage verification request.

6. The method of claim 1, wherein the RBAC data comprises information on a Role Based Access Control (RBAC) permission defined for each of a plurality of users, wherein access of each of the plurality of users to each of a plurality of functions of the airport management network is controlled by the RBAC permission defined for each of the plurality of users.

7. A system for service authentication in an airport management network, comprising:

one or more hardware processors;

a communication interface for enabling the system to communicate with other devices; and a memory storing a plurality of instructions, wherein the plurality of instructions when executed, cause the one or more hardware processors to:

obtain a service request at a transmitting node of the airport management network;

verify expiry of the service request, by:

extracting a time stamp and a date stamp from the service request;

generating a time vector by processing the time stamp using a generated first data model;

generating a date vector by processing the date stamp using a generated second data model;

concatenating the time vector and the date vector to generate a concatenated time-date vector;

processing the concatenated time-date vector using a first dense layer of a neural network implemented by the one or more hardware processors, wherein the dense layer determines whether the service request is expired or not;

process the service request with a Role Based Access Control (RBAC) data and a generated feature map data, via the one or more hardware processors, if the service request is determined as not expired, wherein the RBAC data indicates access permission of a user who raised the service request, and the feature map data confirms that the service request received at the transmitting node and a service request received at a receiving node of the airport management network are matching; and perform one of a) allowing a requested service, and b) denying the requested service, at the receiving node, based on the processing of the service request with the RBAC data and the feature map data.

8. The system of claim 7, wherein the one or more hardware processors are configured to generate the first data model by:

processing the time stamp using a first branch of the comprising:

concatenating the service request and a time expiration data to form a first concatenation vector;

converting the first concatenation vector from a default secure information format to an embedding format using a Long Short Term Memory (LSTM) encoder of the first branch;

selecting one or more variations from among a plurality of variations identified in the first concatenation vector in the embedding format, as focused variations, using an attention layer of the first branch;

decoding the one or more focused variations using a LSTM decoder of the first branch;

processing output of the LSTM decoder using a time-distributed dense layer of the first branch to reduce number of trainable parameters at a defined minimum level; and generating the first data model using the trainable parameters.

9. The system of claim 7, wherein the one or more hardware processors are configured to generate the second data model by:

concatenating the service request and a date expiration data to form a second concatenation vector;

converting the second concatenation vector from a default secure information format to an embedding format using a Long Short Term Memory (LSTM) encoder of the second branch;

selecting one or more variations from among a plurality of variations identified in the second concatenation vector in the embedding format, as focused variations, using an attention layer of the second branch;

decoding the one or more focused variations using a LSTM decoder of the second branch;

processing output of the LSTM decoder using a time-distributed dense layer of the second branch to reduce number of trainable parameters at a defined minimum level; and generating the second data model using the trainable parameters.

10. The system of claim 7, wherein the one or more hardware processors are configured to generate the feature map by:
  receiving a first feature vector and a second feature vector, wherein the first feature vector corresponds to the service request received at the transmitting node and the second feature vector corresponds to the service request received at the receiving node;
  extracting a plurality of key features from the first feature vector by processing the first feature vector using a plurality of convolutional blocks of a first sub-branch of a third branch of the neural network;
  extracting a plurality of key features from the second feature vector by processing the second feature vector using a plurality of convolutional blocks of a second sub-branch of the third branch of the neural network;
  concatenating the plurality of key features from the first feature vector and the plurality of key features from the second feature vector to generate a concatenated key feature vector; and
  processing the concatenated key feature vector using a plurality of convolution blocks of the third branch, wherein the plurality of convolution blocks of the third branch generates the feature map data.

11. The system of claim 7, wherein the service request is one of a passenger verification request and a baggage verification request.

12. The system of claim 7, wherein the RBAC data comprises information on a Role Based Access Control (RBAC) permission defined for each of a plurality of users, wherein access of each of the plurality of users to each of a plurality of functions of the airport management network is controlled by the RBAC permission defined for each of the plurality of users.

13. One or more non-transitory machine-readable information storage mediums comprising one or more instructions which when executed by one or more hardware processors cause:
  obtaining a service request at a transmitting node of the airport management network;
  verifying expiry of the service request, comprising:
    extracting a time stamp and a date stamp from the service request;
    generating a time vector by processing the time stamp using a generated first data model;
    generating a date vector by processing the date stamp using a generated second data model;
    concatenating the time vector and the date vector to generate a concatenated time-date vector;
    processing the concatenated time-date vector using a first dense layer of a neural network implemented by the one or more hardware processors, wherein the dense layer determines whether the service request is expired or not;
  processing the service request with a Role Based Access Control (RBAC) data and a generated feature map data, if the service request is determined as not expired, wherein
    the RBAC data indicates access permission of a user who raised the service request, and
    the feature map data confirms that the service request received at the transmitting node and a service request received at a receiving node of the airport management network are matching; and
  performing one of a) allowing a requested service, and b) denying the requested service, at the receiving node, based on the processing of the service request with the RBAC data and the feature map data.

14. The one or more non-transitory machine-readable information storage mediums of claim 13, wherein generating the first data model comprises:
  concatenating the service request and a time expiration data to form a first concatenation vector;
  converting the first concatenation vector from a default secure information format to an embedding format using a Long Short Term Memory (LSTM) encoder of the first branch;
  selecting one or more variations from among a plurality of variations identified in the first concatenation vector in the embedding format, as focused variations, using an attention layer of the first branch;
  decoding the one or more focused variations using a LSTM decoder of the first branch;
  processing output of the LSTM decoder using a time-distributed dense layer of the first branch to reduce number of trainable parameters at a defined minimum level; and
  generating the first data model using the trainable parameters.

15. The one or more non-transitory machine-readable information storage mediums of claim 13, wherein generating the second data model comprises:
  concatenating the service request and a date expiration data to form a second concatenation vector;
  converting the second concatenation vector from a default secure information format to an embedding format using a Long Short Term Memory (LSTM) encoder of the second branch;
  selecting one or more variations from among a plurality of variations identified in the second concatenation vector in the embedding format, as focused variations, using an attention layer of the second branch;
  decoding the one or more focused variations using a LSTM decoder of the second branch;
  processing output of the LSTM decoder using a time-distributed dense layer of the second branch to reduce number of trainable parameters at a defined minimum level; and
  generating the second data model using the trainable parameters.

16. The one or more non-transitory machine-readable information storage mediums of claim 13, wherein generating the feature map data comprises:
  receiving a first feature vector and a second feature vector, wherein the first feature vector corresponds to the service request received at the transmitting node and the second feature vector corresponds to the service request received at the receiving node;
  extracting a plurality of key features from the first feature vector by processing the first feature vector using a plurality of convolutional blocks of a first sub-branch of a third branch of the neural network;
  extracting a plurality of key features from the second feature vector by processing the second feature vector using a plurality of convolutional blocks of a second sub-branch of the third branch of the neural network;
  concatenating the plurality of key features from the first feature vector and the plurality of key features from the second feature vector to generate a concatenated key feature vector; and
  processing the concatenated key feature vector using a plurality of convolution blocks of the third branch, wherein the plurality of convolution blocks of the third branch generates the feature map data.

17. The one or more non-transitory machine-readable information storage mediums of claim 13, wherein the service request is one of a passenger verification request and a baggage verification request.

18. The one or more non-transitory machine-readable information storage mediums of claim 13, wherein the RBAC data comprises information on a Role Based Access Control (RBAC) permission defined for each of a plurality of users, wherein access of each of the plurality of users to each of a plurality of functions of the airport management network is controlled by the RBAC permission defined for each of the plurality of users.

\* \* \* \* \*